United States Patent [19]

Nishida et al.

[11] 4,220,125
[45] Sep. 2, 1980

[54] IGNITION TIMING CONTROL SYSTEM FOR INTERNAL COMBUSTION ENGINES

[75] Inventors: Minoru Nishida; Tadashi Hattori, both of Okazaki; Hiroaki Yamaguchi, Nukata, all of Japan

[73] Assignee: Nippon Soken, Inc., Nishio, Japan

[21] Appl. No.: 891,127

[22] Filed: Mar. 28, 1978

[30] Foreign Application Priority Data

May 27, 1977 [JP] Japan ................................. 52-62658

[51] Int. Cl.$^2$ ........................................... F02M 52/00
[52] U.S. Cl. .................................... 123/407; 123/416
[58] Field of Search ....... 123/117 R, 117 D, 146.5 A, 123/32 EB

[56] References Cited

U.S. PATENT DOCUMENTS

| 3,815,500 | 6/1974 | Wahl et al. ...................... 123/117 R |
| 3,816,717 | 6/1974 | Yoshida et al. ................. 123/32 EB |
| 3,835,819 | 9/1974 | Anderson, Jr. .................. 123/117 R |
| 4,003,354 | 1/1977 | Canup ............................ 123/117 R |
| 4,073,270 | 2/1978 | Endo .............................. 123/32 EB |

Primary Examiner—Charles J. Myhre
Assistant Examiner—Raymond A. Nelli
Attorney, Agent, or Firm—Cushman, Darby & Cushman

[57] ABSTRACT

In normal load operating conditions of the engine, an ignition timing control unit produces an ignition timing signal in accordance with the rotation speed and intake negative pressure of the engine. In transitions, for example, from idling operation to normal load operation, and vice versa, an ignition timing delaying circuit in the ignition timing control unit produces a correction signal by detecting whether or not the throttle valve is fully closed. When the correction signal is produced, the ignition timing control unit produces corrected ignition timing signal so that, in the transient periods of operation, the ignition timing is gradually changed to a predetermined ignition timing.

4 Claims, 7 Drawing Figures

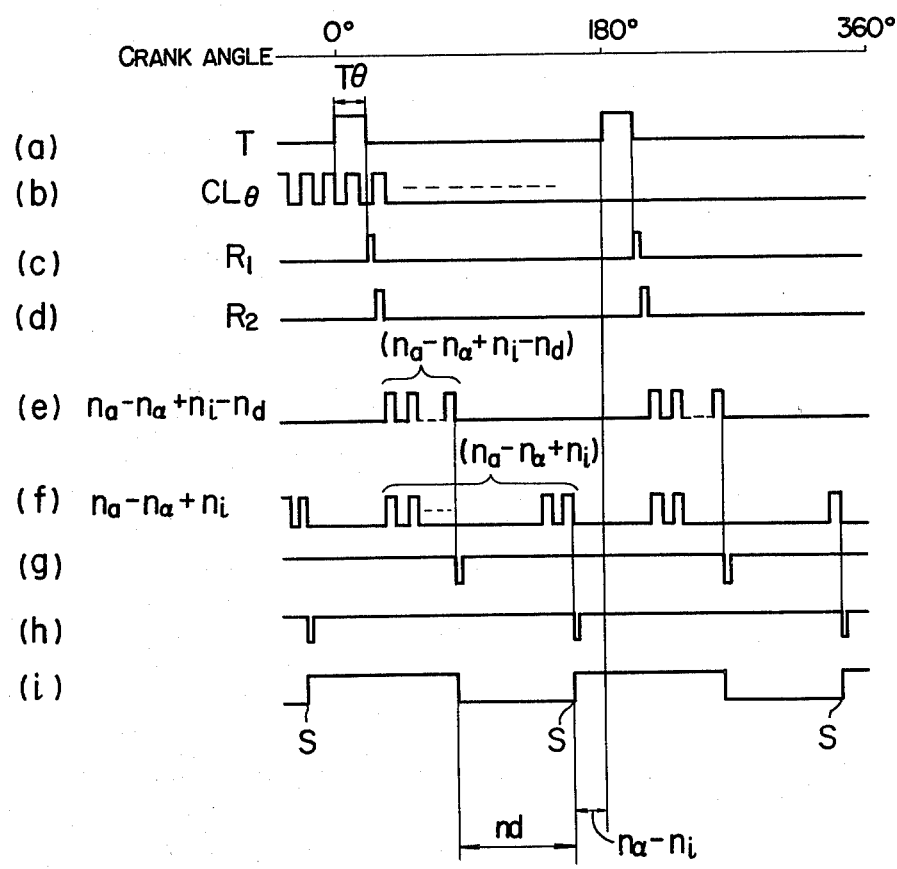

4,220,125

IGNITION TIMING CONTROL SYSTEM FOR INTERNAL COMBUSTION ENGINES

BACKGROUND OF THE INVENTION

The present invention relates to an ignition timing control system for internal combustion engines which ensures a smooth change in the ignition timing of an engine during the periods of transition from the idling operation to the operation under load or during the periods of deceleration from the normal operation to thereby ensure stability in the operation of the engine. The ignition timing of an internal combustion engine must be determined in accordance with the conditions of the engine to ensure optimum operation of the engine. The ignition timing control systems known in the art may be divided broadly into two type of systems, i.e., mechanical and electronic systems. With either of these systems, it has been the general practice to determine the desired ignition timing by employing the rotation speed and intake manifold pressure of the engine as two basic factors and controlling the ignition timing in response to these two engine conditions. More specifically, both of these systems are so designed that the values of advance angle $\alpha N$ using only rotation speed N as a variable and the values of advance angle $\alpha P$ using only intake negative pressure P as a variable are preliminarily programmed, and in the actual operation of the engine the ignition timing is determined in accordance with the sum $\alpha N + \alpha P$ of the values corresponding to the rotation speed and the intake negative pressure. In particular, the setting of the advance angle $\alpha P$ in relation to the intake manifold pressure must be such that the advance angle $\alpha P$ assumes a minimum value of 0° at the idling operation where the throttle valve of the engine is fully closed, and at the operation under load after the throttle valve has been opened from the fully closed position the advance angle $\alpha P$ must be gradually reduced from its maximum value as the throttle valve opening is increased or the intake negative pressure is decreased to approach the atmospheric pressure.

To meet such ignition advance requirements of an engine, an arrangement has been proposed in which the intake negative pressure in an advancer port disposed near the throttle valve of the engine is detected so as to decrease the advance angle $\alpha P$ with decrease in the detected intake negative pressure. With the throttle valve open, this arrangement is quite advantageous in that the intake negative pressure is decreased with increase in the opening of the throttle valve and the advance angle $\alpha P$ is controlled to meet the requirements of the engine. However, during the transition periods of the throttle valve from the open position to the fully closed position or from the fully closed position to the open position, the intake negative pressure instantaneously changes from a large negative pressure to about the atmospheric pressure or the intake negative pressure instantaneously changes from about the atmospheric pressure to a large negative pressure. This instantaneous pressure change is caused by the fact that when the throttle valve is at the fully closed position the advancer port is located slightly upstream of the throttle valve thus causing the atmospheric pressure to act therein and that when the throttle valve is opened even a bit the advancer port is positioned downstream of the throttle valve thus causing the engine manifold vacuum to act therein. Consequently, the advance angle $\alpha P$ changes greatly during the transition periods of the throttle valve from its open position to closed position and from its closed position to open position, thus producing detrimental effects on the stable operation of the engine. In other words, the engine operation will be made unstable during the transition periods of the engine to the operation under load and to the idling operation.

SUMMARY OF THE INVENTION

With a view to overcoming the foregoing deficiencies, it is the object of the present invention to provide an ignition timing control system for internal combustion engines which is designed so that during the transition periods of the engine throttle valve from the fully closed position to the open position or from the open position to the fully closed position, the ignition timing is gradually changed to control it at one which suits the engine operating conditions expected after the lapse of a predetermined number of engine revolutions or after the expiration of a predetermined period of time, whereby during the periods of transition between the normal operation and the idling operation or the deceleration operation the advance angle is changed smoothly, thus insuring smooth operation of the engine.

Thus, the system of this invention has among its great advantages the fact that during the periods where the advance angle is changed from the minimum advance angle under low load operation to the normal advance angle or during the periods where the advance angle is changed from the normal advance angle to the minimum advance angle, the ignition timing is changed in such a manner that the ignition timing is adjusted to the desired ignition timing after the lapse of a predetermined number of engine revolutions or after the expiration of a predetermined period of time, whereby during the periods of transition from the normal operation to a low load operation, such as, the idling operation or the deceleration operation, the ignition timing is changed smoothly thus ensuring smooth operation of the engine.

BRIEF DESCRIPTION OF THE DRAWINGS

FIGS. 5 and 6 are time charts useful for explaining the operation of the embodiment shown in FIG. 1.

DESCRIPTION OF THE PREFERRED EMBODIMENT

Figure 1:
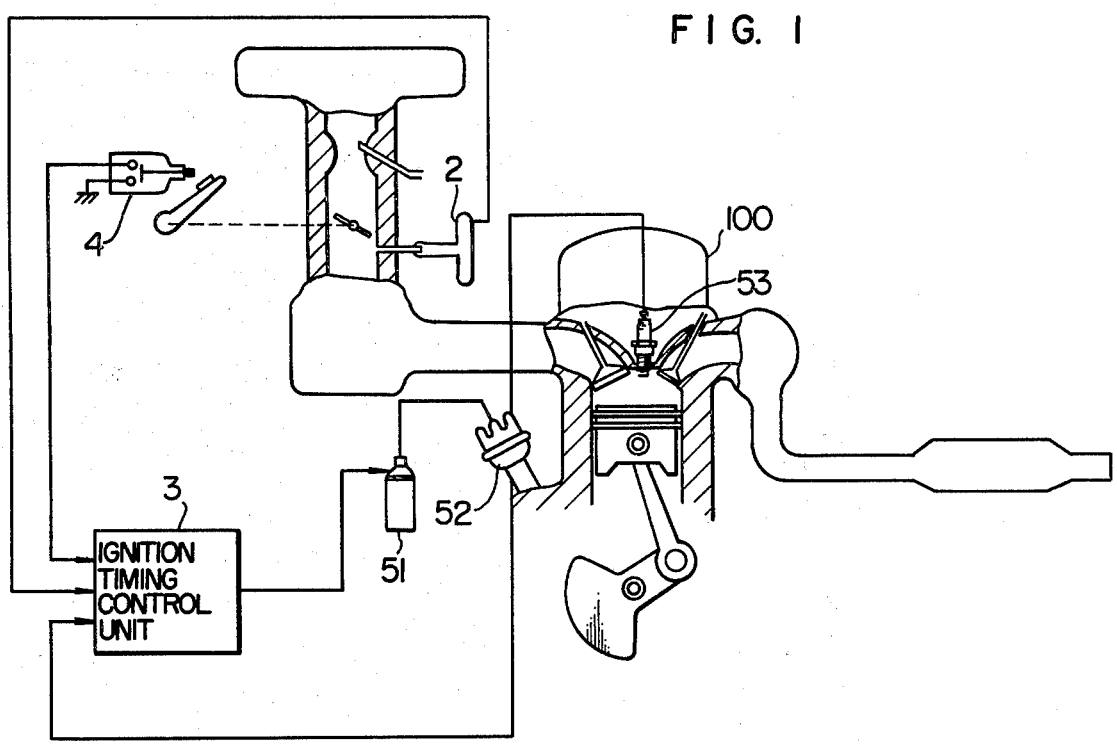
FIG. 1 is a schematic diagram of an embodiment of an ignition timing control system according to the invention, showing the principal parts of the system in section.

The present invention will now be described in greater detail with reference to the illustrated embodiment. FIG. 1 is a schematic diagram of an internal combustion engine incorporating an ignition timing control system according to the invention. In the Figure, numberal 100 designates a four-cylinder, four-cycle internal combustion engine, 11 a throttle valve, 2 an intake pressure detector for detecting the intake negative pressure on the manifold side (the downstream side of the throttle valve 11), and 4 a throttle position detector for detecting whether the throttle valve 11 is at the fully closed position to generate an on-off output. Numeral 3 designates an ignition timing control unit, 51 an ignition coil, 52 a distributor incorporating an angular position detecting unit, and 53 a spark plug.

Figure 2:
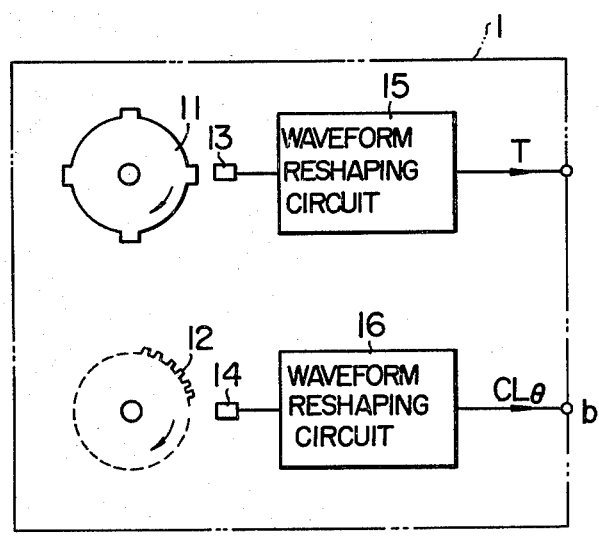
FIG. 2 is a schematic diagram showing the construction of the angular position detecting unit used in the embodiment of FIG. 1.

As shown in FIG. 2, an angular position detecting unit 1 incorporated in the distributor 52 comprises rotors 11 and 12 respectively formed with 4 projections and 720 projections and mounted on the distributor shaft for rotation in synchronism with the rotation of the cam shaft of the engine 100, electromagnetic angular position detectors 13 and 14 and waveform reshaping circuits 15 and 16 for respectively changing the waveform of the signals from the electromagnetic angular position detectors 13 and 14, whereby starting at the top dead center of each cylinder, reference signals T each having a time width $T\theta$ corresponding to a predetermined degrees of crankshaft rotation and angular signals $CL\theta$ each corresponding to 1° of the crankshaft rotation.

Figure 3:
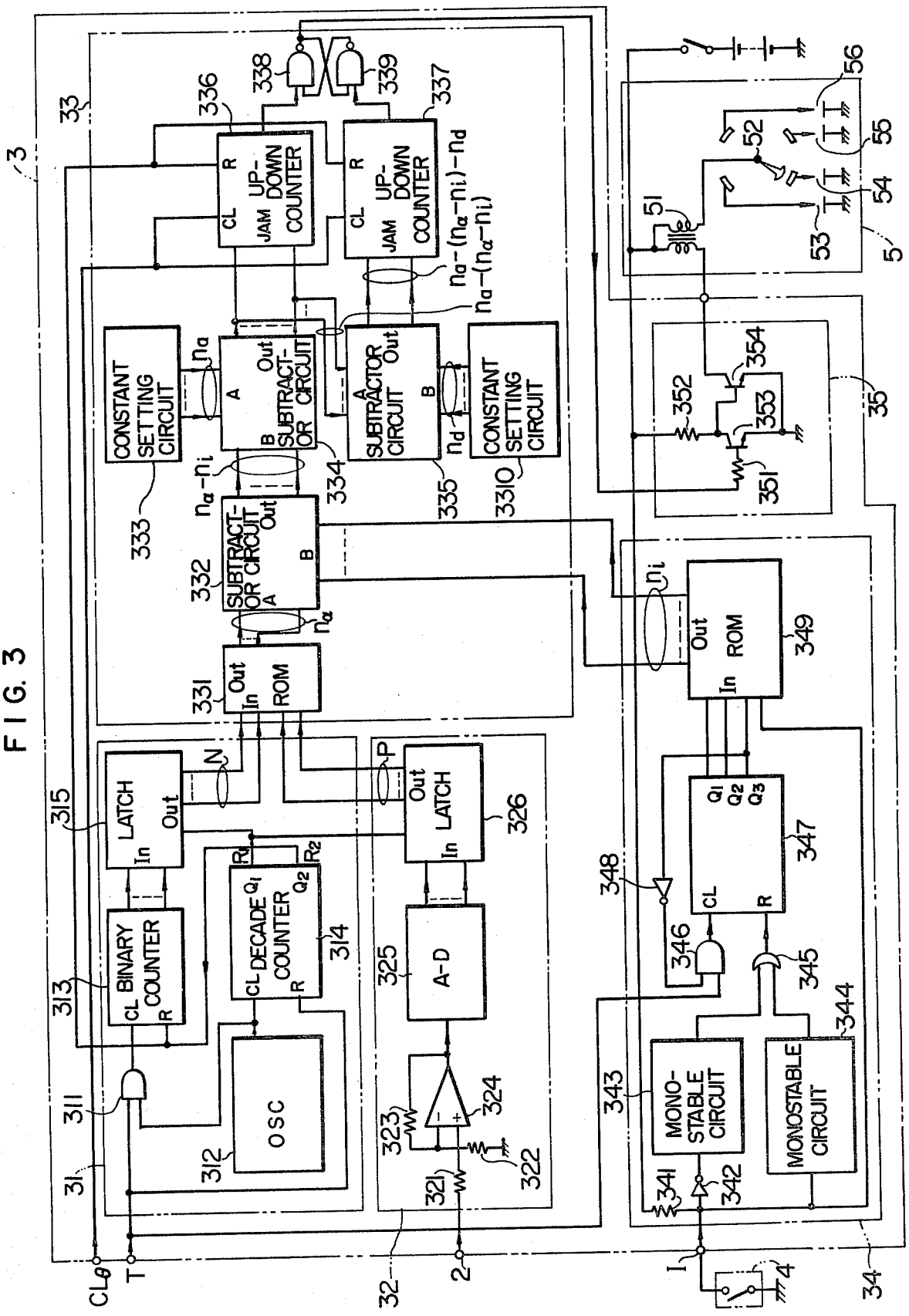
FIG. 3 is a detailed circuit diagram of the embodiment shown in FIG. 1.

Next, a detailed circuit diagram of the system of this invention will now be described with reference to FIG. 3. The ignition timing control unit 3 comprises a first detection circuit 31 for detecting the rotation speed, a second detection circuit 32 for detecting the intake negative pressure, a delay circuit 34 for gradually changing the ignition timing to a desired value as the throttle valve 11 is opened from the fully closed position, an ignition timing computing circuit 33 for computing an ignition timing, and a primary coil control circuit 35 for turning on and off the flow of current in the primary winding of the ignition coil in response to the output of the ignition timing computing circuit 33.

The first detection circuit 31 comprises an AND circuit 311 for receiving the reference signals T, a known type of oscillator circuit 312 for generating high frequency pulses, a binary counter 313, a counter 314 (e.g., the RCA CD4017 and hereinafter referred to as a decade counter) for receiving the reference signal T as a reset input and the output of the oscillator circuit 312 as a clock input and having decode outputs for successively generating clock pulses after the negative-going transition of the reference signal T and a memory device 315 (hereinafter referred to as a latch), whereby the number of the clock pulses applied during the time that the reference signal T is at a "1" level or during the predetermined degrees of crankshaft rotation, is counted by the binary counter 313 and stored in the latch 315 for every ½ revolution of the engine, thus detecting the rotation speed of the engine.

The second detection circuit 32 comprises an amplifier circuit adapted to receive the output of the intake pressure detector 2 as an input and including resistors 321, 322 and 323 and an operational amplifier 324 for amplifying the output of the intake pressure detector 2, an A/D converter 325 for converting the amplifier output or analog quantity into a digital quantity, and a latch 326 for receiving and storing the output of the A/D converter 325 for every ½ revolution of the engine, whereby detecting the intake negative pressure of the engine. The resulting outputs of the first and second detection circuits 31 and 32, that is, the detected rotation speed N and intake negative pressure P are applied to the ignition timing computing circuit 33.

The delay circuit 34 comprises a resistor 341, an inverter 342, two monostable circuits 343 and 344 each adapted to generate a signal of a fixed pulse width in response to the positive-going transition of its input pulse, an OR circuit 345, an AND circuit 346, a binary counter 347, an inverter 348, and a read-only memory device 349 (hereinafter referred to as an ROM), whereby generating an output ni indicative of the degree of opening of the throttle valve 11.

Figure 4A:
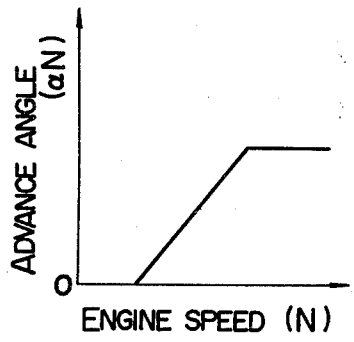
FIG. 4 shows a typical rotation speed and intake pressure advance characteristic diagrams.
Figure 4B:
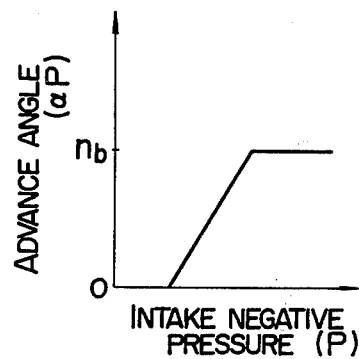

The ignition timing computing circuit 33 comprises an ROM 331 for generating an ignition timing output $n\alpha$ corresponding to the outputs of the latch 315 and the latch 326, a known type of subtractor circuit 332 for subtracting the output ni of the ROM 349 from the output $n\alpha$ of the ROM 331, constant setting circuits 333 and 3310 (e.g., switches for setting binary codes) for setting respective constants na and nd, a known type of subtractor circuit 334 for subtracting the output $n\alpha-$ni of the subtractor circuit 332 from the output na of the constant setting circuit 333, a known type of subtractor circuit 335 for subtracting the output nd of the constant setting circuit 3310 from the output na$-(n\alpha-$ni) of the subtractor circuit 334, an up-down counter 336 (e.g., the RCA CD4029) for receiving the output na$-(n\alpha-$ni) of the subtractor circuit 334 as a JAM input, the angular pulses $CL\theta$ as a clock input and the output $R_2$ of the decade counter 314 as a reset input and counting down as many as the na$-(n\alpha-$ni), an up-down counter 337 for similarly counting down as many as the output na$-(n\alpha-$ni)$-$nd of the subtractor circuit 335, and a flip-flop circuit comprising NAND circuits 338 and 339 and adapted to receive the outputs of the up-down counters 336 and 337. In the ignition timing computing circuit 33, the output $n\alpha$ of the ROM 331 represents for example the sum of two advance angles $\alpha N$ and $\alpha P$. The advance angles $\alpha N$ and $\alpha P$ are the advance angles determined respectively in relation to the engine speed N and the intake negative pressure P as shown in FIGS. 4(A) and 4(B), respectively.

The primary coil control circuit 35 comprises resistors 351 and 352 and transistors 353 and 354, whereby the flow of current in the primary winding of the ignition coil is subjected to on-off control.

The ignition device 5 comprises the ignition coil 51, the distributor 52, and the spark plugs 53, 54, 55 and 56, whereby the spark plugs 53 to 55 mounted in the respective cylinders are caused to produce respective ignition sparks when the flow of current in the primary winding of the ignition coil 51 switched off.

The operation of the above-described embodiment will now be described with reference to the time charts shown in FIGS. 5 and 6. The angular position detecting unit 1 generates, starting at the top dead center of each cylinder, two reference signals T each having a time width correspondng to a predetermined angle of rotation for every crankshaft rotation (½ camshaft rotation) and an angular signal $CL\theta$ for every 1° of the crankshaft position as shown in (a) and (b) of FIG. 5. In response to the clock pulses from the oscillator circuit 312, the decade counter 314 generates two signals $R_1$ and $R_2$ sequentially following the negative-going transition of the reference signal T as shown in (c) and (d) of FIG. 5. In this case, the time interval from the negative-going transition of the reference signal T until the negative-going transition of the signal $R_2$ is selected sufficiently smaller than 1° of the crankshaft rotation throughout the range of the engine operations. The AND circuit 311 performs the AND operation on the clock pulses and the reference signal T so that the binary counter 313 counts the clock pulses applied during the predetermined rotational angle $T\theta$ and the count value of the counter 313 is stored in the latch 315 in response to the negative-going transition of the reset signal $R_1$. Consequently, the count of the pulses stored in the latch 315 has a value corresponding to the rotation speed N and it increases with decrease in the rotation speed.

In the like manner, the second detection circuit 32 stores the detected intake negative pressure in the latch 326 in response to the negative-going transition of the reset signal $R_1$. Here, the intake pressure detector 2 is always positioned downstream of the throttle valve 11 so as to detect the intake negative pressure on the manifold side (the downstream side of the throttle valve 11), and thus the detected negative pressure corresponds to the opening of the throttle valve 11 (the detected negative pressure decreases to approach the atmospheric pressure with increase in the opening of the throttle valve 11), thus causing the output of the latch 326 to assume a value corresponding to the intake negative pressure P.

Figure 6:
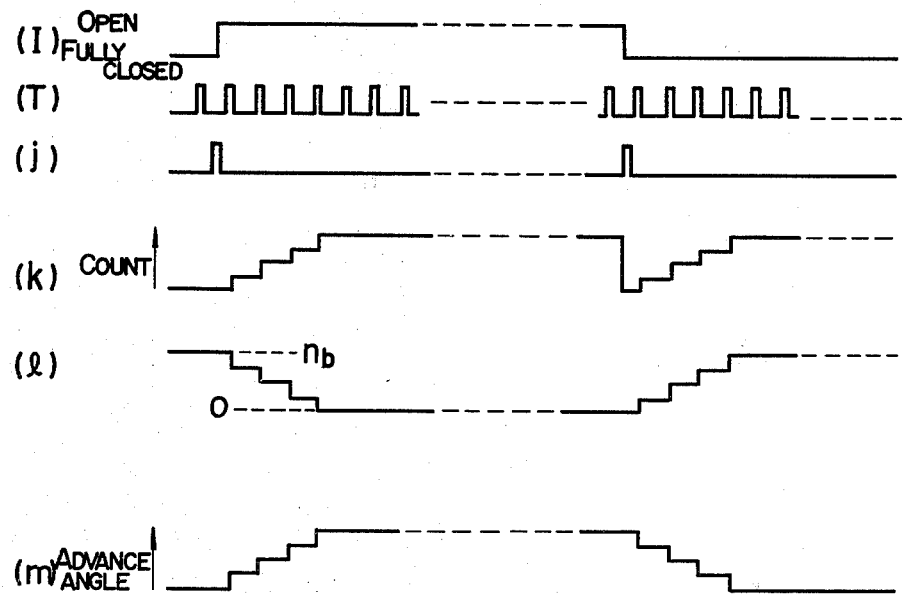

In the delay circuit 34, when the throttle valve 11 is at the fully closed position, the switch of the throttle position detector 4 is closed so that the output I of the throttle position detector 4 goes to the "0" level as shown in (I) of FIG. 6, and the output I goes to the "1" level when the throttle valve 11 is opened. The signal (I) is directly applied to the monostable circuit 344 and consequently a monostable pulse is generated in response to the positive-going transition of the signal (I), and the monostable circuit 343 receives an inverted signal of the signal (I) thus generating a monostable pulse in response to the negative-going transition of the signal (I). These monostable pulses are applied to the OR circuit 345 and consequently a monostable pulse is generated as shown in (j) of FIG. 6 each time the switch of the throttle position detector 4 is turned on or off. When the throttle valve 11 is opened from the fully closed position, the signal (j) is applied to the reset input of the binary counter 347 so that since the output $Q_3$ of the binary counter 347 is initially at "0", the output of the inverter 348 goes to "1" and the reference signals T shown in (a) of FIG. 5 and (T) of FIG. 6 are directly delivered to the output of the AND circuit 346 and applied to the clock input of the binary counter 347. Consequently, as shown in (k) of FIG. 6, the binary counter 347 starts counting the reference signals T from the time that the throttle valve 11 is opened from the fully closed position and the output $Q_3$ of the binary counter 347 goes to "1" in response to the fourth pulse. When this course, the output of the inverter 348 goes to "0" and the reference signals T are no longer applied to the clock input of the binary counter 347 thus stopping the counting. When the throttle valve 11 is again moved from the open position to the fully closed position, a signal (j) is again applied to the reset input of the binary counter 347 and the counter 347 again starts counting up from zero. The outputs $Q_1$, $Q_2$ and $Q_3$ of the binary counter 347 and the signal (I) from the throttle position detector 4 are applied to the ROM 349 with the result that as shown in (l) of FIG. 6, when the throttle valve 11 is opened from the fully closed position the ROM 349 generates an output which gradually decreases from a predetermined value nb to zero, whereas when the throttle valve 11 is moved from the open position to the fully closed position, an output ni is generated which gradually increases up to the predetermined value nb. In other words, the necessary values have been preliminarily programmed into the ROM 349 so that in response to increase in the output count value of the binary counter 347 the output of the ROM 349 is gradually decreased from the predetermined value nb down to zero when the output of the throttle position detector 4 is at the "1" level, and the ROM 349 also have another values preliminarily programmed thereinto so that when the output of the throttle position detector 4 is at the "0" level, as the output count value of the binary counter 347 increases the output of the ROM 349 is increased gradually from zero up to the predetermined value nb. As will be seen from FIG. 4(B), this predetermined value nb represents the value of the maximum advance angle $\alpha P$. On the other hand, the outputs of the first and second detection circuits 31 and 32 are applied to the ROM 331 of the ignition timing computing circuit 33 and consequently the ROM 331 generates a predetermined value n$\alpha$ corresponding to the rotation speed N and the intake pressure P. Thus, as mentioned previously, the subtractor circuits 332, 334 and 335 respectively generate outputs n$\alpha$−ni, n$\alpha$−(n$\alpha$−ni) and n$\alpha$−(n$\alpha$−ni)−nd, so that the up-down counter 336 counts as many angular signals CL$\theta$ as the n$\alpha$−(n$\alpha$−ni) from the time of the negative-going transition of the signal $R_2$ as shown in (f) of FIG. 5 and generates at the time of the completion of the counting a pulse which goes to "0" as shown in (h) of FIG. 5. Similarly, the up-down counter 337 counts as many angular signals CL$\theta$ as the n$\alpha$−(n$\alpha$−ni)−nd from the time of the negative-going transition of the signal $R_2$ and generates a pulse which goes to "0" as shown in (g) of FIG. 5. Consequently, the output of the flip-flop circuit comprising the NAND circuits 338 and 339 consists of a pulse which goes to the "0" level in response to the signal (g) and which goes to the "1" level in response to the signal (h) as shown in (i) of FIG. 5. When the signal (i) goes to the "0" level, the transistor 353 is turned off and the transistor 354 is turned on, thus causing the flow of current in the primary winding of the ignition coil 51. When the signal (i) goes to the "1" level, the flow of current in the primary winding is interrupted so that a high voltage is induced in the secondary winding and it is distributed through the distributor 52 to successively cause the spark plugs 53, 54, 55 and 56 in the respective cylinders to spark.

In this case, since the angular signal CL is a signal corresponding to 1° of crankshaft rotation, the signals shown in (g) and (h) of FIG. 5 go to the "0" level at the lapse of (n$\alpha$−n$\alpha$+ni−nd)° and (n$\alpha$−n$\alpha$+ni)°, respectively, after the negative-going transition of the signals $R_2$. Since the time interval between the negative-going transition of the reference signal T and the negative-going transition of the signal $R_2$ is less than 1°, if the predetermined value n$\alpha$ is (180−T$\theta$), then the total advance angle $\alpha$ from the top dead center of each cylinder is given as $\alpha = (n\alpha - ni)°$ and the number of degrees through which current flows in the ignition coil 51 is given by nd. Thus, as shown by the solid lines in (m) of FIG. 6, the final advance angle $\alpha$ gradually changes for every ½ revolution of the engine and is brought into a steady-state condition after every two revolutions of the engine.

The above described operation of the embodiment may be summarized in relation to the movement of the throttle valve, as follows.

When the engine is at the idling operation where the throttle valve 11 is at the fully closed position, the detected negative pressure is large and the advance angle $\alpha P$ determined in relation to the negative pressure P has a maximum value nb and the advance angle $\alpha N$ determined in relation to the rotation speed N has a minimum value of 0 substantially, thus making the advance angle $n\alpha$ substantially equal to the advance angle $nb$. With the throttle valve closed, the correction value $ni$ becomes equal to the maximum value $nb$ and consequently the final result becomes $n\alpha - ni = 0$, that is, the degree of spark advance has the minimum value of 0°. When the throttle valve 11 is opened from the fully closed position or during the transition from the idling operation to the operation under load, the correction value $ni$ is decreased for every ½ revolution of the engine and consequently the final advance angle $n\alpha - ni$ is gradually increased from the advance angle of 0° under the idling operation. As a result, there is no danger of the ignition timing being changed rapidly, thus ensuring stable operation of the engine.

When the engine makes two or more revolutions after the opening of the throttle valve 11, the correction value $ni$ is reduced to zero and consequently the final advance angle becomes the sum $n\alpha$ of the advance angle $\alpha N$ corresponding to the rotation speed and the advance angle $\alpha P$ corresponding to the detected negative pressure.

During the deceleration operation where the throttle valve 11 is moved from the open position into the fully closed position, the detected negative pressure becomes considerably high and consequently the advance angle $\alpha P$ provided according to the negative pressure P becomes substantially equal to the maximum value $nb$. At the instant that the throttle valve 11 is closed, the correction value $ni$ is gradually increased from zero up to the maximum value $nb$, with the result that the final advance angle is gradually decreased for every ½ revolution of the engine from the advance angle $n\alpha$ toward zero and it is stabilized at the advance angle $n\alpha = 0$ after two revolutions of the engine. In this way, the ignition timing is prevented from being changed rapidly thus ensuring stable operation of the engine.

The above-described embodiment illustrates only one form of the present invention, and various changes and modifications may be made without departing from the scope of the invention. Typical of such changes and modifications may be summarized as follows.

Instead of gradually changing the ignition timing for every ½ revolution of the engine and bringing it into a steady-state condition after two revolutions of the engine, it is possible to arrange so that the ignition timing is brought into a steady-state condition after less than or more than two engine revolutions or alternately the ignition timing may be brought into a steady-state condition within a predetermined period of time.

Further, while the fully closed position of the throttle valve is detected by the throttle position detector so as to detect a predetermined load condition of the engine, this may be detected by means of the intake pressure.

Still further, the angle during which current flows in the ignition coil is fixed, this angle may be made proportional to the engine speed, thus maintaining constant the time during which current flows in the ignition coil.

Still further, while the advance angle indicative of the ignition timing is controlled according to the intake pressure, the advance angle may be controlled in accordance with the opening of the throttle valve or the flow rate of intake air.

We claim:

1. An ignition timing control system for internal combustion engines comprising:
   first detecting means, responsive to an intake condition of an engine, for producing a first detection output indicative of the intake condition;
   second detecting means, responsive to the rotation of said engine, for producing a second detection output indicative of the rotational speed;
   third detecting means, responsive to movement of the throttle valve of said engine, for producing a third detection output related to the movement of the throttle valve to and from a closed position;
   first setting means, responsive to said first and second detection outputs, for producing a first setting output indicative of the ignition timing corresponding to the intake condition and the rotational speed of said engine;
   second setting means, responsive to said third detection output, for producing a second setting output which gradually changes between first and second constant values, said second setting output changing from said first constant value to said second constant value when the throttle valve of said engine is opened from the closed condition and changing from said second constant value to said first constant value when the throttle valve of said engine is closed from the open condition;
   means responsive to said first and second setting outputs for producing an output indicative of ignition timing, said ignition timing output gradually changing, in response to said second setting output, when said throttle valve leaves or enters a fully closed position, so that a resultant advance angle is gradually increased at a rate less than the rate of change of said first setting output when said throttle valve is opened from the fully closed position, and the resultant advance angle is gradually decreased at a rate less than the rate of change of said first setting output when said throttle valve is fully closed thereby to prevent the ignition timing being varied rapidly; and
   igniting means responsive to said output of said output producing means for producing an ignition spark in synchronization with the corrected ignition timing.

2. An ignition timing control system according to claim 1 further comprising:
   position detecting means, responsive to the rotation of said engine, for producing a reference position output each time said engine rotates to a predetermined reference position, said reference position output being applied to said second detecting means so that the rotational speed of said engine is detected in response thereto.

3. An ignition timing control system according to claim 2, wherein said second setting means includes:
   counter means having a reset input responsive to said third detection output and for counting said reference position output until the count value thereof reaches a predetermined value; and
   memory means, responsive to the output of said counter means, for changing said second setting output in response to the output of said counter means according to a predetermined program stored therein.

4. A method for controlling ignition timing for an internal combustion engine comprising the steps of:
   generating an intake pressure signal related to the negative intake pressure of said engine;
   generating an engine speed signal related to the rotational speed of said engine;

generating a throttle valve movement signal related to the movement of the throttle valve of said engine to and from a closed position;

producing an ignition timing signal in accordance with said intake pressure signal and said engine speed signal;

producing a correction signal in response to said throttle valve movement signal, said correction signal being varied decreasingly from a predetermined value to zero when said throttle valve is opened from a fully closed position, and said correction signal being varied increasingly from zero to said predetermined value when said throttle valve is fully closed from an open position; and correcting said ignition timing signal in response to said correction signal and providing a corrected ignition timing signal such that a resultant advance angle is gradually increased from zero advance angle to a predetermined value when said throttle valve is opened from the fully closed position, and the resultant advance angle is gradually decreased to zero advance angle when said throttle valve is fully closed thereby to prevent the ignition timing being varied rapidly.

* * * * *